(12) United States Patent
Arocena De La Rua et al.

(10) Patent No.: US 9,068,555 B2
(45) Date of Patent: Jun. 30, 2015

(54) ELEMENT FOR LIFTING THE BLADE AND METHOD FOLLOWED

(75) Inventors: Ion Arocena De La Rua, Sarriguren (ES); Eneko Sanz Pascual, Sarriguren (ES)

(73) Assignee: GAMESA INNOVATION & TECHNOLOGY, S. L., Sarriguren (ES)

( * ) Notice: Subject to any disclaimer, the term of this patent is extended or adjusted under 35 U.S.C. 154(b) by 10 days.

(21) Appl. No.: 13/521,124

(22) PCT Filed: Dec. 30, 2010

(86) PCT No.: PCT/ES2010/000533
§ 371 (c)(1),
(2), (4) Date: Jul. 9, 2012

(87) PCT Pub. No.: WO2011/086205
PCT Pub. Date: Jul. 21, 2011

(65) Prior Publication Data
US 2013/0025113 A1    Jan. 31, 2013

(30) Foreign Application Priority Data

Jan. 14, 2010  (ES) .................................. 201000042
Mar. 12, 2010  (ES) .................................. 201000330

(51) Int. Cl.
*F03D 1/00* (2006.01)
*B66C 1/62* (2006.01)
*F03D 1/06* (2006.01)

(52) U.S. Cl.
CPC ........... *F03D 1/001* (2013.01); *Y10T 29/49963* (2015.01); *B66C 1/62* (2013.01);

(Continued)

(58) Field of Classification Search
CPC ............ B66C 1/10; B66C 1/66; B66C 1/108; B66C 23/185; B66F 1/00; B66F 9/00; B66F 19/00; B23P 17/00; F03D 11/04
USPC ............ 29/525.11, 889.2; 52/223.13, 745.17; 269/1; 290/55; 294/67.1, 215; 414/800
See application file for complete search history.

(56) References Cited

U.S. PATENT DOCUMENTS 7,883,131 B2 *   2/2011   Camp et al. ................. 294/82.23
8,360,398 B2 *   1/2013   Diaz De Corcuera et al. ............................. 254/131

(Continued)

FOREIGN PATENT DOCUMENTS

DE    1 995 516 U    10/1968
EP    1 101 936 A2    5/2001

(Continued)

OTHER PUBLICATIONS

Patent English Abstract and Machine English Translation of 2006-152862 A Published Jun. 15, 2006.

*Primary Examiner* — Alexander P Taousakis
(74) *Attorney, Agent, or Firm* — Ladas & Parry LLP

(57) ABSTRACT

A blade hoisting element is an intermediate piece placed between the root of the blade and the mobile track of the blade bearing. This piece comprises at least an insert and joins, by a rigid rod or strut with another intermediate piece opposing diametrically. The piece has a hole for connecting to the hoisting point and another hole for connecting to the hub, this latter fastening to the hole of the insert by a long bolt. Two hoisting points are established on the blade, at its root and at the tip; the hoisting point at the root is handled from a single lift point on the hub and the hoisting point at the tip is handled from two lift points: one from the hub and the other from the ground.

17 Claims, 4 Drawing Sheets

(52) U.S. Cl.
CPC ........ *F03D 1/0658* (2013.01); *F05B 2240/916* (2013.01); *F05B 2240/917* (2013.01); *Y02E 10/721* (2013.01); *Y02E 10/728* (2013.01); *F05B 2230/61* (2013.01)

(56) References Cited

U.S. PATENT DOCUMENTS

| | | | | |
|---|---|---|---|---|
| 8,434,799 | B2 * | 5/2013 | Reger | 294/74 |
| 8,544,923 | B2 * | 10/2013 | Inda | 294/215 |
| 8,544,924 | B2 * | 10/2013 | Inda | 294/215 |
| 8,596,700 | B2 * | 12/2013 | Alba | 294/215 |
| 2006/0144741 | A1 * | 7/2006 | Wobben | 206/477 |
| 2007/0290426 | A1 * | 12/2007 | Trede et al. | 269/1 |
| 2009/0107062 | A1 * | 4/2009 | Pedersen | 52/223.13 |
| 2010/0005656 | A1 | 1/2010 | Vangsy | |
| 2012/0107084 | A1 * | 5/2012 | Krogh | 414/800 |

FOREIGN PATENT DOCUMENTS

| | | | |
|---|---|---|---|
| ES | 2 322 000 A1 | 6/2009 | |
| JP | H0351182 U | 5/1991 | |
| JP | 2006-152862 A | 6/2006 | |
| WO | WO 2011020086 * | 2/2011 | B66C 1/48 |

* cited by examiner

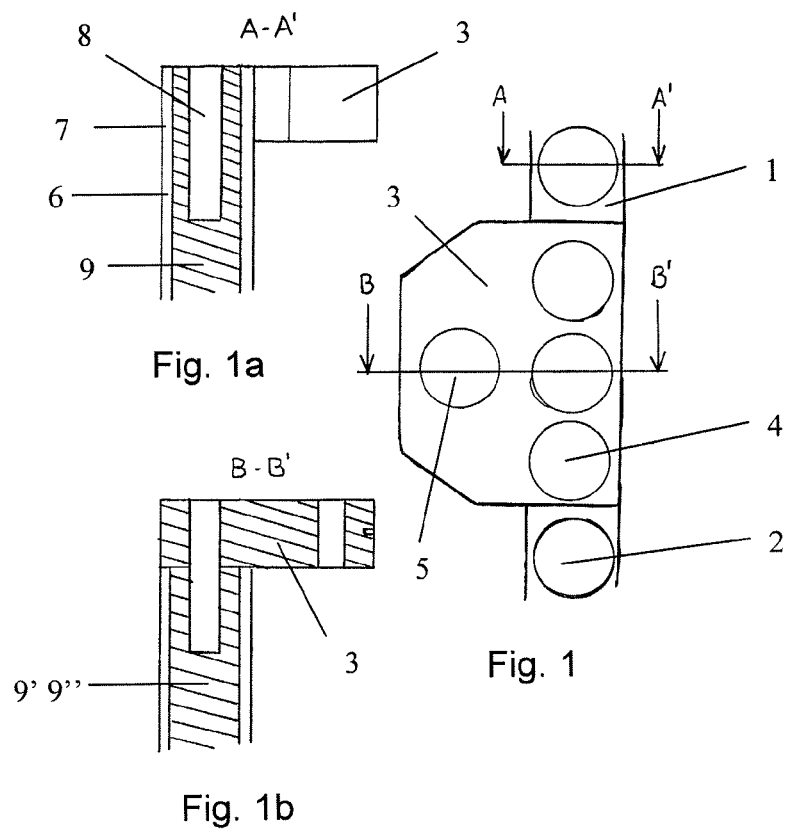
Fig. 1a
Fig. 1b
Fig. 1
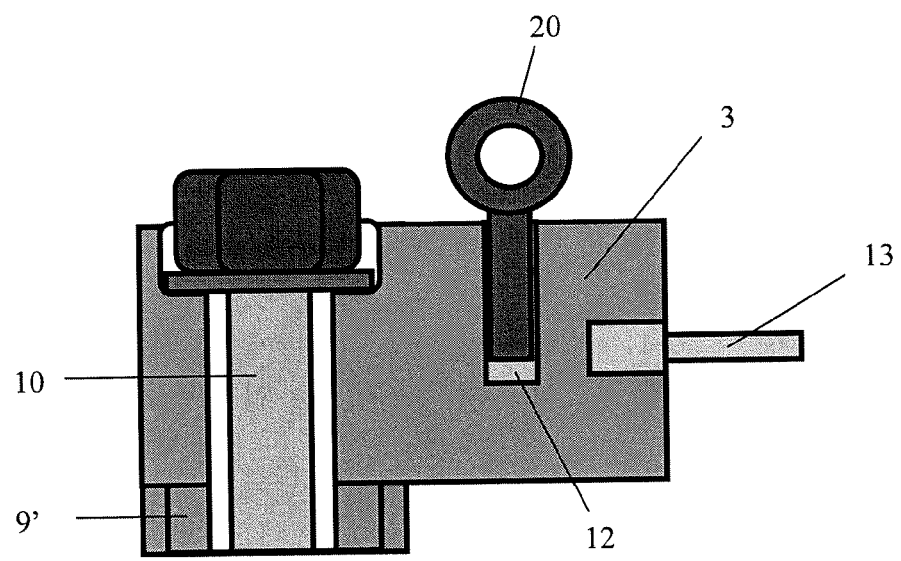
Fig. 2

ELEMENT FOR LIFTING THE BLADE AND METHOD FOLLOWED

RELATED APPLICATION INFORMATION

This application is a 371 of International Application PCT/ES2010/000533 filed 30 Dec. 2010 entitled "Blade Lifting Element and Method Followed", which was published on 21 Jul. 2011, with International Publication Number WO 2011/086205 A1, and which claims priority from Spanish Patent Applications P201000042 filed 14 Jan. 2010 and P201000330 filed 12 Mar. 2010, the content of which is incorporated herein by reference.

OBJECT OF THE INVENTION

The invention describes an element equipped along the wind turbine blade root, permitting blade hoisting without deforming the circular shape of the blade root and dispensing with the use of two cranes. The method to follow for hoisting and securing the blade to the hub is likewise described.

BACKGROUND OF THE INVENTION

The wind rotor is understood as the assembly of components of the wind turbine rotating outside the nacelle. These components are the blades, hub and blade pitch control mechanism. From a design and manufacturing standpoint, each component is considered to be an independent element that must subsequently be assembled. In large wind turbines, the most complex joint to establish is between the blade root and hub, whose joint is in turn aligned with the fixed/mobile track unit and bearings that make up the blade pitch control mechanism.

Large size wind turbine blades are hoisted up and assembled on the wind turbine using hoisting methods that normally require two cranes. One of the cranes of superior height than the hub's height and the other one of smaller size to properly guide hoisting from the area at the tip of the blade.

The main difficulty of these hoisting methods lies in the unions between the lifting slings, or hoisting cables, and the hoisting points on the blade root. These hoisting points must withstand a significant load corresponding to the largest part of the weight of the blade. Further, the inserts in the blade root cannot be used for securing the slings, since, in the last stage of blade-to-hub assembly, the hub-fastening long bolts must be previously fit into the inserts. On the other hand, given that the blades are made of pieces of low thickness composite material, designing a mechanical joint between the hoisting points and the laminate without damaging the structure of the blade by deforming the initial circular shape, is complicated.

The closest state of the art corresponds to different ways of fastening the hoisting slings with the union points directly applied to the blade root as can clearly be seen in the drawings of patents DE 1995516 and EP 1101936. The solutions shown by these patents are intended for small-sized blades, since as the size of the blade increases, numerous points in the process become even more complicated: the deformation endured by the blade structure under its own weight during hoisting causes the blade root to ovalize and lose the tolerances necessary to readily align all the blade root inserts with the blade bearing holes (those corresponding to the hub) without difficulty. The present invention is directed to avoid the use of two cranes, thus minimizing costs derived from renting, achieving a hoisting method that merely requires lifting points on the hub and anchor points on the ground. Similar to patent P200603165 held by the same applicant. Thus, the invention keeps the hub-fastening long bolts and in turn incorporates elements that prevent the circular section of the blade root from deforming.

DESCRIPTION OF THE INVENTION

The final edge of the blade root is made of several metal inserts embedded or stuck to a laminate of composite material. These inserts represent the union points with the wind turbine hub. A bearing consisting of a fixed track and a mobile track is screwed down to the wind turbine hub. Prior to carrying out the joint between the blade and hub, a long bolt is inserted into each insert so that this bolt can subsequently go through the mobile track on the hub bearing and, with the aid of a nut and its corresponding washer, complete a pre-loaded joint. With the final hub-fastening bolts inserted in the insert orifices, the inserts in the blade root cannot be used for securing them to the elements that, directly or indirectly, are fastened to the slings lifted to hoist the blade.

One object of the invention is the modification of certain inserts in the blade root, replacing them with inserts having the same characteristics although slightly shorter, and a intermediate piece positioned between these inserts and the blade bearing's mobile track.

In a second practical embodiment, certain inserts at the blade root are modified by machining their walls so that they may be screwed into a intermediate piece that will be adjusted between the inserts and the blade bearing's mobile track. Thus, the bolt used in the final assembly could be a normal bolt dispensing with the need to include a double threaded bolt with an intermediate threading to secure the intermediate piece.

Another object of the invention is to provide the intermediate piece am with elements to fasten the sling which will be pulled to hoist the blade, and braces that safeguard the slender shape of the blade root from deformation during hoisting from the full structural weight of the blade.

Another object of the invention is to hoist the blade by lifting from points located outside the root inserts and that these cross tools are sufficiently is rigid to protect the circumference formed at the end of the blade in the root area from damage and, likewise, to replace the braces mentioned in the preceding paragraph.

These and further advantages shall be better understood with the following detailed description based on the attached drawings.

BRIEF DESCRIPTION OF THE DRAWINGS

FIG. 1 shows the intermediate piece on the blade root. FIGS. 1a and 1b are two sections carried out one on the insert and the other on the insert and intermediate piece.

FIG. 2 constitutes a section of the insert and the intermediate piece with particular attention drawn to the provisional fastening.

DESCRIPTION OF THE PREFERENTIAL EXECUTION

Figure 3:
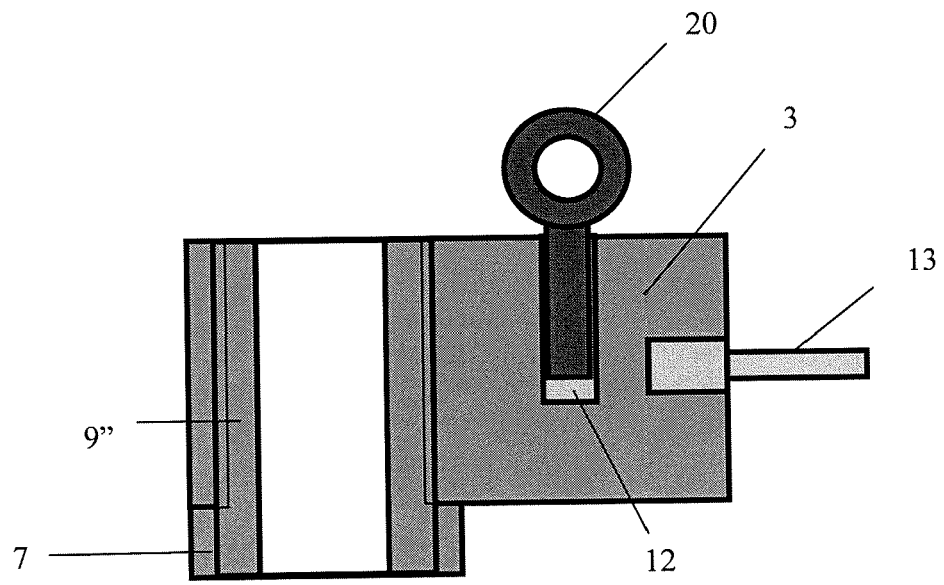
FIG. 3 constitutes a section of the insert and the intermediate piece with particular attention drawn to the threaded fastening established between the two.

As shown in FIG. 1, the invented piece is applied on the root of the blade (1) covering at least one of the holes available on each insert (2). In the shown embodiment, there are three holes on the inserts (2) used by the intermediate piece (3). This intermediate piece (3) has two types of orifices: a hole (4) for connecting to the hub and another hole (5) for connecting to the hoisting point. FIG. 1a shows section AA' established on an insert (9) of the blade root, showing in its interior: the wall (6) of the insert, the composite material (7) and the gap (8) for the fastening element, which is preferably a long bolt. On the outside part, the wall of the intermediate piece (3) is shown. FIG. 1b shows the intermediate piece (3) sectioned along line BB' when connected to an insert (9') (9") that is shorter than the original insert (9).

Section BB' is shown with further detail in FIG. 2. When the original insert (9) has been replaced with an insert (9') (9") having a shorter length, thus reducing the surface of the blade root, the intermediate piece (3) is then mounted.

In order to secure the intermediate piece (3) to the insert (9') having the shorter length during transport and storage, a short bolt (10) is used. In addition, the intermediate piece (3) has a gap (12) to include a hoisting point fastening element and a strut (13) to prevent ovalization of the blade root and give rigidity to the assembly.

As shown in FIG. 3, in a second practical embodiment, some machined inserts (9"), secured to the intermediate piece (3) by a threaded joint and having no sort of recess or gap for housing nuts, are used.

Figure 4:
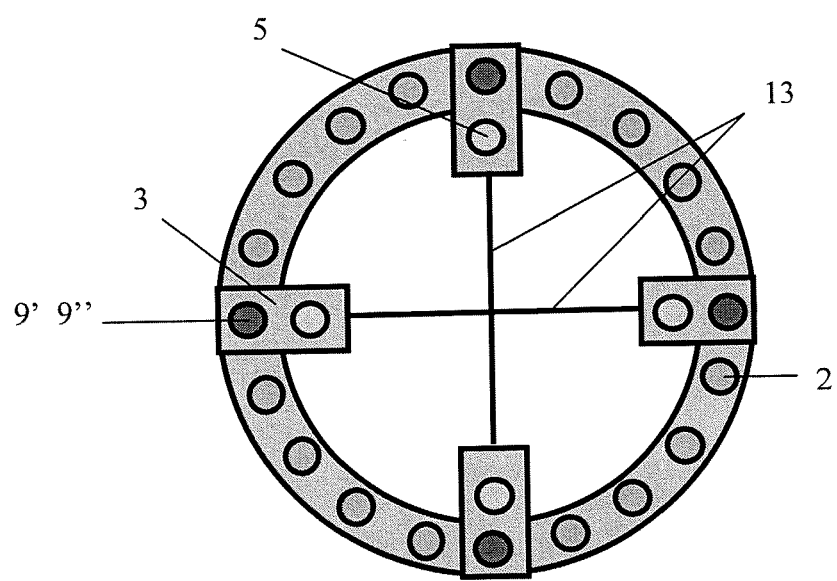
FIG. 4 constitutes a section of the insert-intermediate piece unit once mounted on the hub.
Figure 5:
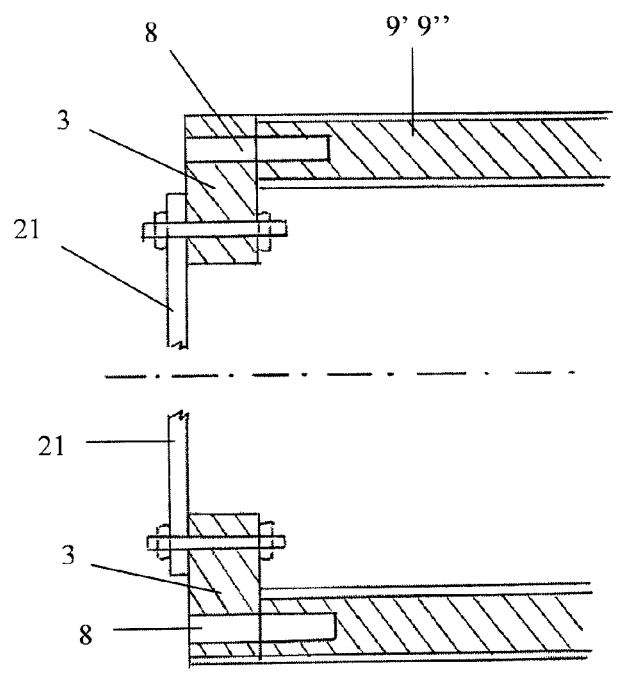
FIG. 5 is a section of the blade root with a rigid tool secured between the intermediate pieces.

Once the appropriate number of intermediate pieces (3) to fit onto the root of the blade (1) has been established, the unit as a whole should appear as shown in FIG. 4. In this case, there are four pieces set at 90° from one to the next and the struts (13) cross over the root of the blade (1) following perpendicular diameters. In the embodiment shown in this figure, each intermediate piece (3) is set on a single insert (9'), which leaves the hoisting point connection hole (5) on the inner circle formed by the root of the blade (1). On the hoisting point connection hole (5) there is an eyebolt (20) as shown in FIGS. 2 and 3, or a rigid rod (21) as the one represented in FIG. 5, fastened to the aforementioned holes (5). In the other practical embodiment mentioned and represented in FIG. 5, the use of a rigid rod (21) where at least one hoisting sling is fastened, can provide the enough rigidity to the blade root to eliminate the strut cables (13) of the previous embodiment.

Figure 6:
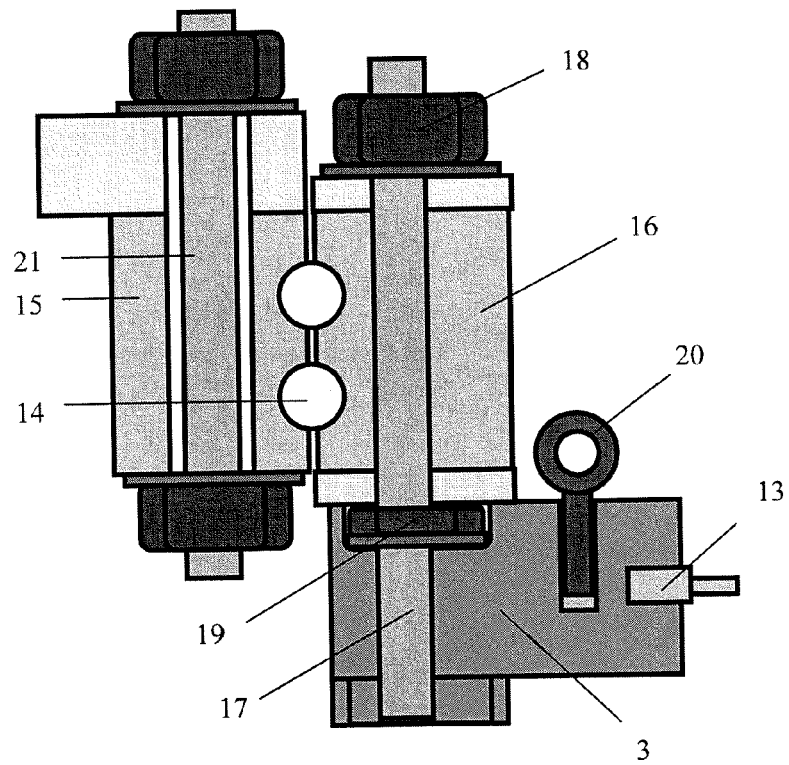
FIG. 6 shows a general view of the blade root with various intermediate pieces mounted.

When the blade has been hoisted and secured to the hub, the unit appears as in FIG. 6. The hub is comprised by the blade bearings (14) themselves, the fixed bearing track (15) and the mobile bearing track (16). The joint between the intermediate piece (3) and the mobile track (16) is made with a special triple-threaded long bolt (17). The mentioned bolt has its ends and intermediate part threaded to couple with a nut (18) to secure the mobile track, a shorter intermediate nut (19) to fasten the intermediate piece (3) and, on the other end is screwed onto the interior of the insert (9'). The intermediate nut (19) is screwed onto the center part of the special long bolt (17), and serves to transmit the hoisting loads from the intermediate piece (3) to the insert (9').

Figure 7:
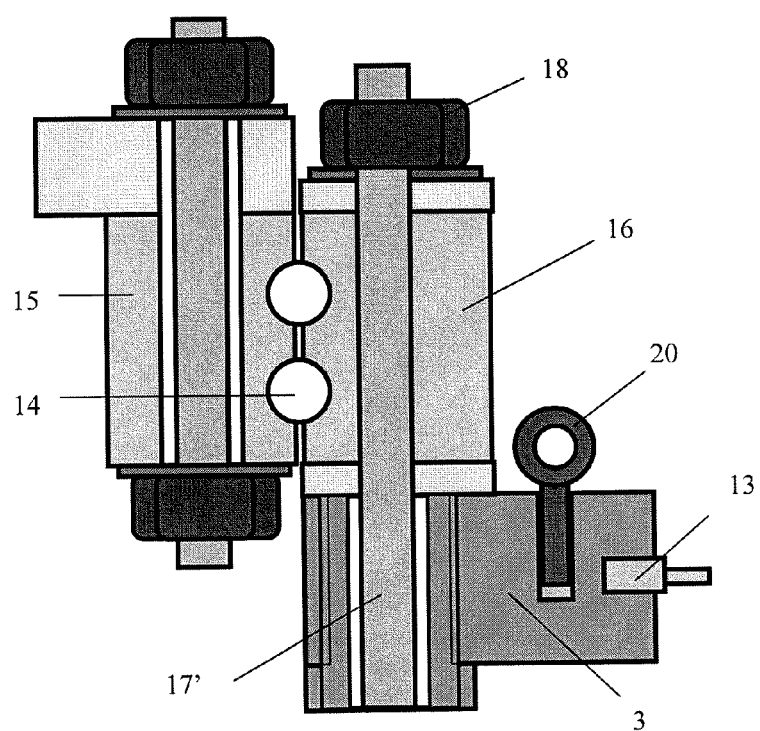
FIG. 7 constitutes a section of the insert-intermediate piece unit once mounted on the hub.

If, instead of the shortened insert (9'), a threaded insert (9") is used, this creates the aforementioned second embodiment, FIG. 7 represents the blade once hoisted and secured to the hub. The hub comprises the blade bearings (14) themselves, the fixed bearing track (15) and the mobile bearing track (16). The joint between the intermediate piece (3) and the mobile track (16) is made with a long bolt (17'). The ends of the mentioned bolt (17') are threaded to couple at one end with a nut (18) to secure the mobile track, while the other end is screwed onto the interior of the machined insert (9"). The hoisting loads are transferred through the threaded joint between the intermediate piece (3) and the insert (9").

Using the invented tool, the inserts (9') (9") on the root of the blade (1) are thus adapted to fit the bolts (17) (17') for fastening to the hub, hence the blade can be hoisted both horizontally, which occurs in the first hoisting stage, as well as vertically, posture adopted during the second hoisting stage.

The hoisting method is described in the group of figures forming FIG. 8. Two hoisting points are established on the blade: the point at the blade root and the one at the blade tip which is established at the last third of the blade by means of a tool set along the edge of the blade. These two hoisting points are handled from three external points:

the blade root hoisting point is maneuvered at a single lifting point from the hub, the blade tip hoisting point is maneuvered at two lifting points: one from the hub and the other from the ground.

Figure 8A:
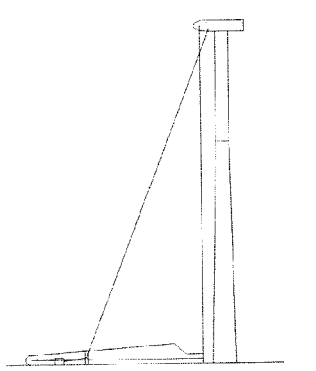
FIG. 8 comprises five figures from "a" to "e", with the blade lifting sequence from the ground to the hub.
Figure 8B:
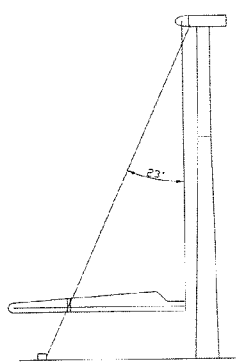
Figure 8C:
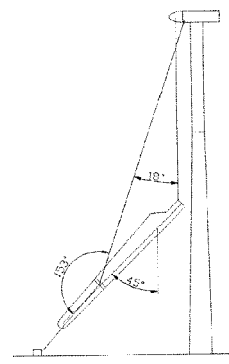
Figure 8D:
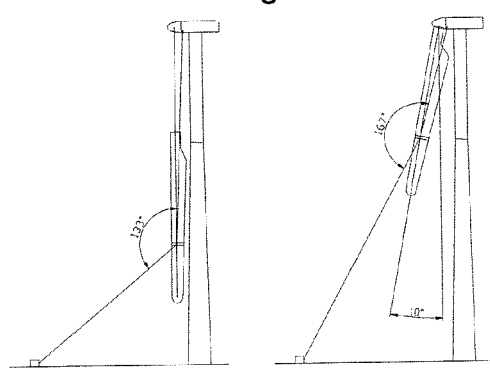
Figure 8E:
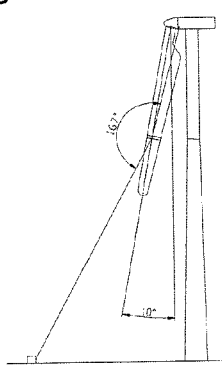

The sequence of the assembly from the ground is as follows:

The blade is extended horizontally at the base of the tower with the root close to the tower. FIG. 8a. The blade begins to rise horizontally, lifted from the sling fastened to the blade root. While the blade root lifts, the sling going through the tool which is secured to the blade tip, lifts from the tip too, lifting it at the same time. This continues until the sling from the hub, which passes through the blade tip, is aligned with the fastening on the ground. FIG. 8b. From this point, the blade root continues lifting while the blade begins to turn until reaching its vertical posture. FIGS. 8c and 8d. The lifting from the sling of the root continues until the blade root is at the same height as the hub. Maneuvering the blade tip's sling, the hub-fastening bolts are faced to the mobile bearing track, and the assembly is completed. FIG. 8e.

The blade dismounting sequence is the inversion of these same steps.

The invention claimed is:

1. A blade hoisting element with at least one cable or sling for lifting a blade of a wind turbine, wherein
    the blade hoisting element comprises at least two intermediate pieces facing each other and fastened to a lower edge of a root of the blade,
    each intermediate piece comprises at least a single insert that aligns with a hub-connection hole of the root of the blade,
    each intermediate piece has a hoisting point connection hole and a joint element that extends between each diametrically opposed intermediate piece when the at least two intermediate pieces are fastened to the lower edge of the root of the blade,
    wherein each intermediate piece is fastened to a mobile track of a hub bearing by a long bolt cooperating with a threaded hole of the mobile track at one of its ends and with the intermediate piece at the other end.

2. The blade hoisting element according to claim 1, wherein the joint element is at least a rigid rod extending between the hoisting point connection holes of the two diametrically opposed intermediate pieces.

3. The blade hoisting element according to claim 1,
wherein the fastening of the intermediate piece to the blade root is carried out first by threading at least one machined insert inside the intermediate piece and then fastening the intermediate piece onto the blade root by using a fastening element.

4. The blade hoisting element according to claim 3, wherein the long bolt is used to fasten the intermediate piece to the root of the blade and to the mobile track of the hub bearing, wherein
the long bolt is threaded at both ends and threaded at its center, wherein
one end of the long bolt is screwed onto the interior of the insert and the hub-connection hole which are both adapted for housing the threaded long bolt, a short intermediate nut is screwed at the center of the long bolt for fastening the intermediate piece to the root of the blade, and a nut is fastened at the other end of the long bolt to secure the mobile track to the intermediate piece and to the root of the blade.

5. The blade hoisting element according to claim 3, wherein the fastening element utilized during blade storage and transport is a short bolt that secures the intermediate piece to the blade root.

6. The blade hoisting element according to claim 1, wherein the hoisting point hole of the intermediate piece is used for fastening an eyebolt for securing the hoisting sling to the intermediate piece.

7. The blade hoisting element according to claim 1, wherein connection of the blade hoisting element with the hoisting sling is made from a point hole of a rigid bar whose end is fastened to the hoisting point connection hole of the intermediate piece.

8. A blade hoisting method for a wind turbine using the blade hoisting element of claim 1,
comprising the step of lifting a wind turbine blade having two blade hoisting points using three external lifting points, wherein
there are two lifting points on a hub of the wind turbine and one lifting point on the ground, wherein
one blade hoisting point is a blade root hoisting point established on the root of the blade, the other blade hoisting point is a blade tip hoisting point established on the last third of the blade by a tool secured the blade, wherein
the blade root hoisting point is maneuvered from a single lifting point on the hub of the wind turbine and the blade tip hoisting point is maneuvered from one lifting point on the hub of the wind turbine and one lifting point on the ground.

9. The blade hoisting method according to claim 8, further comprising the steps of
laying the blade horizontally at the foot of a wind turbine tower with the blade root close to the tower and a sling fastened to the blade root and another sling fastened to a tool at the tip of the blade,
lifting the blade horizontally by pulling from the sling going to the blade root until the sling going to the blade tip is aligned from the hub to the ground fastening,
from this point, rotating the blade root so that it adopts its vertical posture by pulling from the sling on the blade root,
continue pulling from the blade root's sling until the blade root is at the same height as the wind turbine hub,
maneuvering the blade tip's sling so that a hub-fastening bolt is facing an insert of a mobile bearing track of the wind turbine.

10. The blade hoisting element according to claim 1, wherein the insert is machine-threaded.

11. The blade hoisting element according to claim 1, wherein the joint element is a strut extending from the wall of the intermediate piece and which is perpendicular to the hub-connection hole and the hoisting point connection hole.

12. The blade hoisting element according to claim 1, wherein each intermediate piece has as many inserts as hub-connection holes covered by the intermediate piece.

13. A blade hoisting element with at least one cable or sling for lifting a blade of a wind turbine, wherein
the blade hoisting element comprises at least two intermediate pieces facing each other and fastened to a lower edge of a root of the blade,
each intermediate piece comprises at least a single insert that aligns with a hub-connection hole of the root of the blade,
each intermediate piece has as many inserts as hub-connection holes covered by the intermediate piece,
each intermediate piece has a hoisting point connection hole and a joint element that extends between each diametrically opposed intermediate piece when the at least two intermediate pieces are fastened to the lower edge of the root of the blade,
the fastening of the intermediate piece to the blade root is carried out first by threading at least one machined insert inside the intermediate piece and then fastening the intermediate piece onto the blade root by using a fastening element, wherein
the fastening of the intermediate piece to a mobile track of a hub bearing is made by a long bolt co-operating with a threaded hole of the mobile track at one of its ends while the other end of the long bolt is screwed onto the interior of the machined insert.

14. The blade hoisting element according to claim 13, wherein the long bolt is used to fasten the intermediate piece to the root of the blade and to the mobile track of the hub bearing, wherein
the long bolt is threaded at both ends and threaded at its center, wherein
one end of the long bolt is screwed onto the interior of the insert and the hub-connection hole which are both adapted for housing the threaded long bolt, a short intermediate nut is screwed at the center of the long bolt for fastening the intermediate piece to the root of the blade, and a nut is fastened at the other end of the long bolt to secure the mobile track to the intermediate piece and to the root of the blade.

15. The blade hoisting element according to claim 13, wherein the fastening element utilized during blade storage and transport is a short bolt that secures the intermediate piece to the blade root.

16. A blade hoisting element with at least one cable or sling for lifting a blade of a wind turbine, wherein
the blade hoisting element comprises at least two intermediate pieces facing each other and fastened to a lower edge of a root of the blade,
each intermediate piece comprises at least a single insert that aligns with a hub-connection hole of the root of the blade,
each intermediate piece has a hoisting point connection hole and a joint element that extends between each diametrically opposed intermediate piece when the at least two intermediate pieces are fastened to the lower edge of the root of the blade,
wherein the joint element of each intermediate piece is at least a rigid rod extending between the hoisting point connection holes of the two diametrically opposed intermediate pieces or is at least a strut extending from the wall of the intermediate piece and which is perpendicular to the hub-connection hole and the hoisting point connection hole, wherein each intermediate piece is fastened to a mobile track of a hub bearing by a long bolt cooperating with a threaded hole of the mobile track at one of its ends and an intermediate piece at the other end.

17. The blade hoisting element according to claim 16, wherein each intermediate piece has as many inserts as hub-connection holes covered by the intermediate piece.

\* \* \* \* \*